(12) United States Patent
Wegerer et al.

(10) Patent No.: US 12,110,459 B2
(45) Date of Patent: Oct. 8, 2024

(54) PROCESS FOR PRODUCING DIESEL FUEL FROM A BIORENEWABLE FEED WITH RECYCLED SULFUR

(71) Applicant: UOP LLC, Des Plaines, IL (US)

(72) Inventors: David A. Wegerer, Lisle, IL (US); James T. Wexler, Wheaton, IL (US); Xin X. Zhu, Long Gove, IL (US); Donald Eizenga, Elk Grove Village, IL (US); Rafael Alcala, Des Plaines, IL (US); Ashish Mathur, Gurugram (IN); Gautam Pandey, Gurugram (IN); Hari S. Bajpai, Gurgaon (IN)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 17/465,406

(22) Filed: Sep. 2, 2021

(65) Prior Publication Data

US 2022/0112430 A1 Apr. 14, 2022

Related U.S. Application Data

(60) Provisional application No. 63/090,057, filed on Oct. 9, 2020.

(51) Int. Cl.
*C10G 3/00* (2006.01)
*C10L 1/08* (2006.01)

(52) U.S. Cl.
CPC .............. *C10G 3/52* (2013.01); *C10L 1/08* (2013.01); *C10G 2300/1011* (2013.01); *C10G 2300/1051* (2013.01); *C10G 2300/202* (2013.01); *C10G 2300/4081* (2013.01); *C10G 2300/42* (2013.01); *C10G 2400/04* (2013.01); *C10L 2200/043* (2013.01); *C10L 2200/0446* (2013.01); *C10L 2200/0484* (2013.01); *C10L 2270/026* (2013.01); *C10L 2270/04* (2013.01); *C10L 2290/12* (2013.01); *C10L 2290/541* (2013.01); *C10L 2290/542* (2013.01)

(58) Field of Classification Search
None
See application file for complete search history.

(56) References Cited

U.S. PATENT DOCUMENTS

| | | | |
|---|---|---|---|
| 6,875,410 B2 | 4/2005 | Satokawa et al. | |
| 8,906,224 B2 | 12/2014 | Prentice et al. | |
| 9,399,607 B2 | 7/2016 | Tsai et al. | |
| 2001/0014304 A1 | 8/2001 | Satokawa et al. | |
| 2009/0326290 A1* | 12/2009 | Bouchy | C10G 45/08 585/264 |
| 2012/0116134 A1* | 5/2012 | Bozzano | C10L 1/02 585/240 |
| 2013/0066120 A1* | 3/2013 | Shabaker | C10G 49/22 585/304 |

(Continued)

*Primary Examiner* — In Suk C Bullock
*Assistant Examiner* — Alyssa L Cepluch
(74) *Attorney, Agent, or Firm* — Paschall & Associates, LLC; James C. Paschall (57) ABSTRACT

The process produces a diesel stream from a biorenewable feedstock by hydrotreating to remove heteroatoms and saturate olefins. The recycle gas is recycled to the hydrotreating reactor without removing hydrogen sulfide, which is needed in the biorenewable feed to keep the hydrotreating catalyst active. A purification unit can be utilized on a purge gas stream to purify the gas and improve hydrogen concentration in the recycle gas when added to the recycle gas.

15 Claims, 4 Drawing Sheets

(56) References Cited

U.S. PATENT DOCUMENTS

2015/0086472 A1  3/2015  Adamopoulos et al.
2018/0119036 A1* 5/2018  Mani .................. C10G 3/50
2018/0280863 A1* 10/2018 Sood .................. B01D 53/047

* cited by examiner

PROCESS FOR PRODUCING DIESEL FUEL FROM A BIORENEWABLE FEED WITH RECYCLED SULFUR

CROSS-REFERENCE TO RELATED APPLICATIONS

This application claims priority from U.S. Provisional Application No. 63/090,057, filed Oct. 9, 2020, which is incorporated herein in its entirety.

FIELD

The field is producing hydrocarbons useful as diesel boiling range fuel or aviation range fuel components from biorenewable feedstock such as triglycerides and free fatty acids found in materials such as plant and animal fats and oils.

BACKGROUND

As the demand for fuel increases worldwide, there is increasing interest in producing fuels and blending components from sources other than crude oil. Often referred to as a biorenewable source, these sources include, but are not limited to, plant oils such as corn, rapeseed, canola, soybean, microbial oils such as algal oils, animal fats such as inedible tallow, fish oils and various waste streams such as yellow and brown greases and sewage sludge. A common feature of these sources is that they are composed of glycerides and free fatty acids (FFA). Both triglycerides and the FFAs contain aliphatic carbon chains having from about 8 to about 24 carbon atoms. The aliphatic carbon chains in triglycerides or FFAs can be fully saturated, or mono, di or poly-unsaturated.

Hydroprocessing can include processes which convert hydrocarbons in the presence of hydroprocessing catalyst and hydrogen to more valuable products. Hydrotreating is a process in which hydrogen is contacted with hydrocarbons in the presence of hydrotreating catalysts which are primarily active for the removal of heteroatoms, such as sulfur, nitrogen, oxygen and metals from the hydrocarbon feedstock. In hydrotreating, hydrocarbons with double and triple bonds such as olefins may be saturated.

The production of hydrocarbon products in the diesel boiling range can be achieved by hydrotreating a biorenewable feedstock. A biorenewable feedstock can be hydroprocessed by hydrotreating to remove metals and deoxygenate oxygenated hydrocarbons followed by hydroisomerization to improve cold flow properties of product diesel. Hydroisomerization or hydrodewaxing is a hydroprocessing process that increases the alkyl branching on a hydrocarbon backbone in the presence of hydrogen and hydroisomerization catalyst to improve cold flow properties of the hydrocarbon. Hydroisomerization includes hydrodewaxing herein.

The hydrotreatment of biorenewable feedstock deoxygenates the oxygenated hydrocarbons resulting in production of $H_2O$, $CO_2$ and $CO$ in the hydrotreated effluent. Carbon dioxide may be removed from recycle hydrogen gas in an amine recycle gas scrubber. However, reducing carbon monoxide concentration requires other means such as purging or the water gas shift reaction which forms carbon dioxide. Carbon monoxide is poisonous to hydrotreating catalyst and must therefore be removed to avoid buildup of a deactivating concentration of carbon monoxide.

Biorenewable feedstock contains less sulfurous hydrocarbons than mineral feedstock. Thus, relatively less hydrogen sulfide is produced in the hydrotreatment of biorenewable feedstocks. Hydrotreating catalyst requires sulfidation to ensure the catalyst is activated.

In a two-stage hydrotreating unit for biorenewable feedstock, hydrogen sulfide generated in the hydrodemetallization, and hydrodeoxygenation reactions are typically removed from an interstage hydrotreated stream, so the hydroiso-dewaxing, hydroisomerization, or hydrocracking reactions occur in a sweet environment. "Sweet" denotes that sulfur has been removed from the environment; whereas, "sour" denotes that sulfur is present in the environment. In a single stage unit, the hydrogen sulfide remains present in a sour environment for the downstream hydroisodewaxing, hydroisomerization, or hydrocracking reactions.

The base metal hydrotreating catalysts for hydrodeoxygenation and hydrodemetallization are sulfided to be catalytically active. These hydrotreating reactions produce water and carbon oxides. The reducing hydrogen environment tends to strip sulfur from the hydrotreating catalyst causing deactivation. Since the biorenewable feeds do not have much sulfur content, sulfur is injected into the fresh feed in the form of dimethyl disulfide, polysulfides, disulfide oils, or a refinery sour gas containing hydrogen sulfide to maintain catalyst activity.

An acid gas treating system is needed to remove carbon dioxide to maintain hydrogen purity. Additionally, the produced carbon monoxide is a catalyst poison that inhibits hydrotreating catalyst activity. Carbon monoxide converts to carbon dioxide via the water gas shift reaction, so removal of the carbon dioxide via an amine solvent absorption column also helps to keep the carbon monoxide concentration low. Traditionally, an amine acid gas treating system is installed on the recycle gas circuit by which both carbon dioxide and hydrogen sulfide are removed because hydrogen sulfide is a stronger acid than carbon dioxide.

It would be desirable to provide a process and apparatus for the production of distillate hydrocarbons from a biorenewable feedstock that assures sufficient sulfidation of hydrotreating catalyst.

SUMMARY

The process of the present disclosure recycles hydrogen gas from hydrotreated effluent back to the biorenewable hydrotreating reactor without removing hydrogen sulfide. Hence, little or no sulfur additive need be added to the biorenewable feedstock to assure adequate sulfidation of the hydrotreating catalyst. A portion of the hydrotreated gas stream can be purged and purified to remove impurities such as carbon oxides and recycled back to the hydrotreating reactor. The purified hydrogen stream can be added to the recycle gas to increase its concentration of hydrogen.

DEFINITIONS

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "direct communication" means that flow from the upstream component enters the downstream component without passing through a fractionation or conversion unit to undergo a compositional change due to physical fractionation or chemical conversion.

The term "indirect communication" means that flow from the upstream component enters the downstream component after passing through a fractionation or conversion unit to undergo a compositional change due to physical fractionation or chemical conversion.

The term "bypass" means that the object is out of downstream communication with a bypassing subject at least to the extent of bypassing.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Feeds to the columns may be preheated. The top pressure is the pressure of the overhead vapor at the vapor outlet of the column. The bottom temperature is the liquid bottom outlet temperature. Overhead lines and bottoms lines refer to the net lines from the column downstream of any reflux or reboil to the column. Stripper columns may omit a reboiler at a bottom of the column and instead provide heating requirements and separation impetus from a fluidized inert media such as steam. Stripping columns typically feed a top tray and take main product from the bottom.

As used herein, the term "a component-rich stream" means that the rich stream coming out of a vessel has a greater concentration of the component than the feed to the vessel.

As used herein, the term "a component-lean stream" means that the lean stream coming out of a vessel has a smaller concentration of the component than the feed to the vessel.

As used herein, the term "boiling point temperature" means atmospheric equivalent boiling point (AEBP) as calculated from the observed boiling temperature and the distillation pressure, as calculated using the equations furnished in ASTM D86 or ASTM D2887.

As used herein, the term "True Boiling Point" (TBP) means a test method for determining the boiling point of a material which corresponds to ASTM D-2892 for the production of a liquefied gas, distillate fractions, and residuum of standardized quality on which analytical data can be obtained, and the determination of yields of the above fractions by both mass and volume from which a graph of temperature versus mass % distilled is produced using fifteen theoretical plates in a column with a 5:1 reflux ratio.

As used herein, the term "T5" or "T95" means the temperature at which 5 mass percent or 95 mass percent, as the case may be, respectively, of the sample boils using ASTM D-86 or TBP.

As used herein, the term "initial boiling point" (IBP) means the temperature at which the sample begins to boil using ASTM D2887, ASTM D-86 or TBP, as the case may be.

As used herein, the term "end point" (EP) means the temperature at which the sample has all boiled off using ASTM D2887, ASTM D-86 or TBP, as the case may be.

As used herein, the term "diesel boiling range" means hydrocarbons boiling in the range of an IBP between about 125° C. (257° F.) and about 175° C. (347° F.) or a T5 between about 150° C. (302° F.) and about 200° C. (392° F.) and the "diesel cut point" comprising a T95 between about 343° C. (650° F.) and about 399° C. (750° F.) using the TBP distillation method.

As used herein, the term "diesel conversion" means conversion of feed that boils above the diesel cut point to material that boils at or below the diesel cut point in the diesel boiling range.

As used herein, the term "separator" means a vessel which has an inlet and at least an overhead vapor outlet and a bottoms liquid outlet and may also have an aqueous stream outlet from a boot. A flash drum is a type of separator which may be in downstream communication with a separator that may be operated at higher pressure.

As used herein, the term "predominant" or "predominate" means greater than 50%, suitably greater than 75% and preferably greater than 90%.

The term "$C_x$" are to be understood to refer to molecules having the number of carbon atoms represented by the subscript "x". Similarly, the term "$C_x-$" refers to molecules that contain less than or equal to x and preferably x and less carbon atoms. The term "$C_x+$" refers to molecules with more than or equal to x and preferably x and more carbon atoms.

DETAILED DESCRIPTION

The present disclosure is intended to keep hydrogen sulfide in the recycle gas circuit, so that less sulfur injection is necessary to save operating cost. The expense of sulfur addition and sulfur recovery can also increase operational costs.

A novel process is developed in this disclosure which returns the recycle gas stream to the hydrotreating reactor with the hydrogen sulfide unremoved and still present. A purge stream from the hydrotreated gas stream can be purified to remove carbon dioxide and increase hydrogen purity of the recycle gas stream when added back to a recycle gas stream. The purification unit can involve contacting the recycle gas stream with one or both of a solid media or with an absorbent stream to remove impurities. Because the recycle gas stream contains the majority of hydrogen sulfide the non-indigenous sulfur injection into the reactor will be reduced or eliminated.

The present disclosure may be most applicable to a single stage biorenewable hydrotreating unit but a dual stage biorenewable hydrotreating unit will also have suitability.

Figure 1:
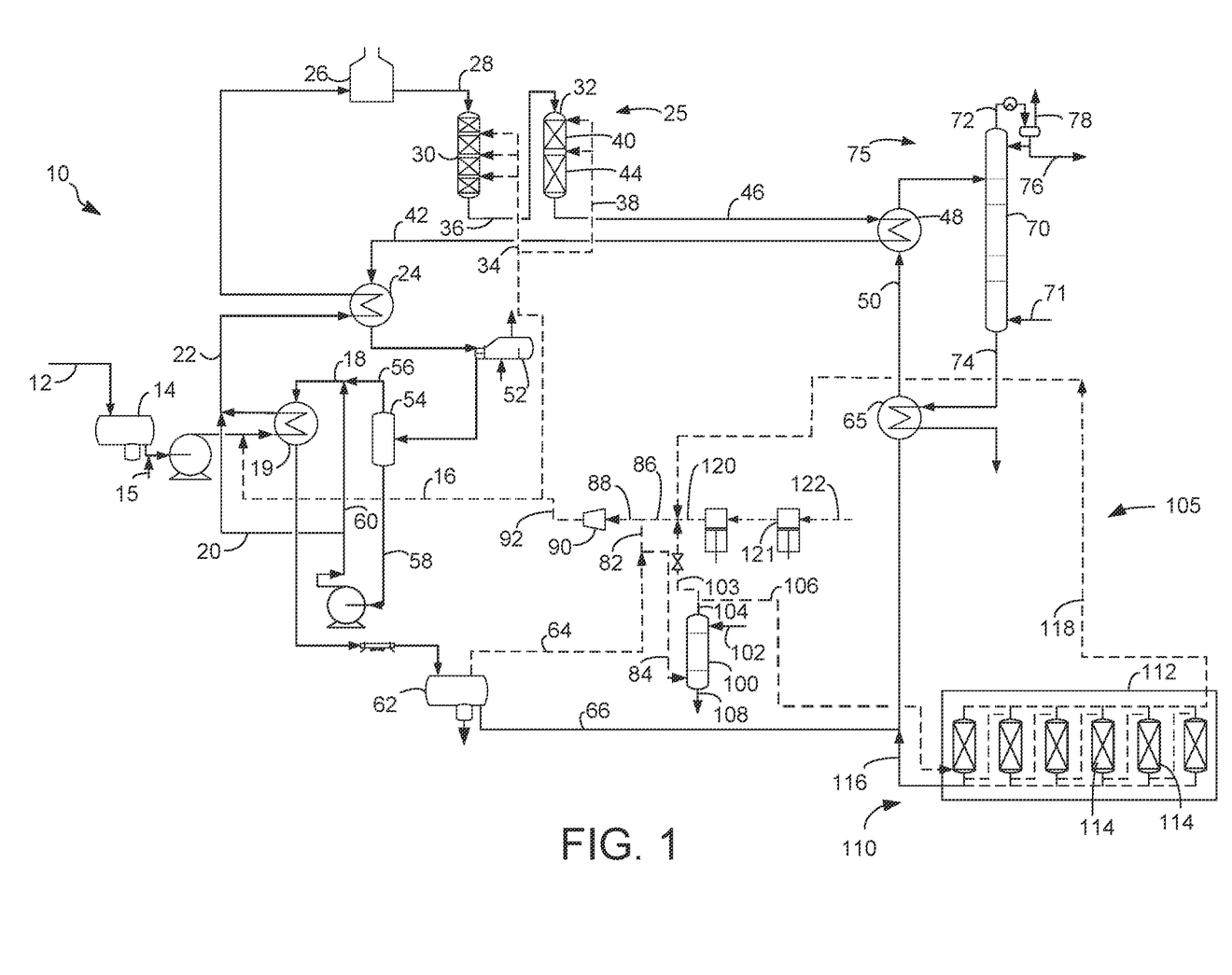
FIG. 1 is a simplified process flow diagram of the present disclosure.

In FIG. 1, in accordance with an exemplary embodiment, a process 10 is shown for processing a biorenewable feedstock. A feed line 12 transports a feed stream of fresh biorenewable feedstock into a feed surge drum 14. The biorenewable feedstock may be blended with a mineral feed stream but it may comprise a predominance of biorenewable feedstock. A mineral feedstock is a conventional feed derived from crude oil that is extracted from the ground. The biorenewable feedstock may comprise a nitrogen concentration of at least about 10 wppm, frequently at least about 25 wppm, suitably at least about 300 wppm, perhaps at least about 500 wppm and up to about 800 wppm nitrogen. The biorenewable feedstock may comprise about 1 to about 1000 wppm sulfur.

A variety of different biorenewable feedstocks may be suitable for the process 10. The term "biorenewable feedstock" is meant to include feedstocks other than those obtained from crude oil. The biorenewable feedstock may include any of those feedstocks which comprise at least one of glycerides and free fatty acids. Most of glycerides will be triglycerides, but monoglycerides and diglycerides may be present and processed as well. Free fatty acids may be obtained from phospholipids which may be a source of phosphorous in the feedstock. Examples of these biorenewable feedstocks include, but are not limited to, camelina oil, canola oil, corn oil, soy oil, rapeseed oil, soybean oil, colza oil, tall oil, sunflower oil, hempseed oil, olive oil, linseed oil, coconut oil, castor oil, peanut oil, palm oil, mustard oil, tallow, yellow and brown greases, lard, train oil, fats in milk, fish oil, algal oil, sewage sludge, and the like. Additional examples of biorenewable feedstocks include non-edible vegetable oils from the group comprising *Jatropha curcas* (Ratanjot, Wild Castor, Jangli Erandi), *Madhuca indica* (Mohuwa), *Pongamia pinnata* (Karanji, Honge), *Calophyllum inophyllum, Moringa oleifera* and *Azadirachta indica* (Neem). The triglycerides and FFAs of the typical vegetable or animal fat contain aliphatic hydrocarbon chains in their structure which have about 8 to about 30 carbon atoms. As will be appreciated, the biorenewable feedstock may comprise a mixture of one or more of the foregoing examples. The biorenewable feedstock may be pretreated to remove contaminants and filtered to remove solids.

Non-indigenous sulfur, such as comprising dimethyl disulfide, may be added to the biorenewable feed stream from a line 15. The biorenewable feed stream in feed line 12 flows from the feed surge drum 14 via a charge pump and mixes with a feed hydrotreating hydrogen stream in line 16, is heated by heat exchange with a combined hot hydrotreated vapor stream in line 18 and is mixed with a hot liquid recycle stream in a line 20 to provide a combined biorenewable feed stream in line 22. The recycle to feed rate can be about 1.5:1 to about 5:1. The combined biorenewable feed stream 12 may be heated in a combined feed exchanger 24 by heat exchange with a hydrotreated stream in a hydrotreated line 42 and/or in a fired heater 26 to a guard bed temperature.

The heated combined biorenewable feed stream in a combined feed line 28 is then charged to a hydrotreating reactor section 25. The hydrotreating reactor section 25 may comprise a guard bed reactor 30 followed by a hydrotreating reactor 32 or it may omit the guard bed reactor perhaps by installing a guard bed in the hydrotreating reactor 32. In an embodiment, the combined biorenewable feed stream is charged to the guard bed reactor 30 to be partially hydrotreated. The guard bed temperature may range between about 218° C. (425° F.) and about 343° C. (650° F.), preferably no more than about 304° C. (580° F.). In the guard bed reactor 30, the combined biorenewable feed stream in the combined feed line 28 is hydrotreated in the presence of the hydrotreating hydrogen stream comprising hydrogen sulfide and a hydrotreating catalyst to hydrodeoxygenate the combined biorenewable feed stream to provide a hydrotreated stream. The hydrodeoxygenation reactions occurring in the guard bed reactor 30 include hydrodecarbonylation and hydrodecarboxylation reactions. Additionally, other hydrotreating reactions occur in the guard bed reactor 30 including olefin saturation, hydrodemetallation, which removes phosphorous, hydrodesulfurization and hydrodenitrification. The feed hydrotreating hydrogen stream in line 16 contains hydrogen sulfide, such that hydrogen sulfide is continuously supplied to the guard bed reactor 30 to maintain sulfidation of the hydrotreating catalyst and its activity.

The guard bed reactor and the hydrotreating reactor temperatures are kept low, less than 343° C. (650° F.) for typical biorenewable feedstocks and less than 304° C. (580° F.) for feedstocks with higher free fatty acid (FFA) concentration to avoid polymerization of olefins found in FFA.

The guard bed catalyst can comprise a base metal on a support. Base metals useable in this process include nickel, chromium, molybdenum and tungsten. Other base metals that can be used include tin, indium, germanium, lead, cobalt, gallium and zinc. The base metals are active in the sulfide form. Hydrogen sulfide is provided in the hydrotreating hydrogen stream in line 92 to the guard bed reactor 30 in the feed hydrotreating hydrogen stream in line 16 in the range of about 50 to about 2000 wppm and preferably, about 500 to about 1200 wppm, on a fresh feed basis. The biorenewable feedstock can be charged at pressures from 1379 kPa (abs) (200 psia) to 6895 kPa (abs) (1000 psia). In a further embodiment, the guard bed catalyst can comprise a second metal, wherein the second metal includes one or more of the metals: tin, indium, ruthenium, rhodium, rhenium, osmium, iridium, germanium, lead, cobalt, gallium, zinc and thallium. A nickel molybdenum on alumina catalyst may be a suitable catalyst in the guard bed reactor 30. Multiple guard beds may be contained in the guard bed reactor 30 such as 2, 3, 4 or more and a hydrogen quench from a guard bed hydrotreating hydrogen stream in line 34 may be injected at spaced or interbed locations to control temperature exotherms. Hydrogen is also provided to the guard beds in the guard bed reactor 30 from the guard bed hydrogen stream in line 34 from the hydrotreating hydrogen stream in line 92 by interbed quench injection. The guard bed hydrogen stream may have the same composition including hydrogen sulfide as the feed hydrotreating hydrogen stream in line 16.

A contacted biorenewable feed stream is discharged from the guard bed reactor 30 in the contacted feed line 36 at a guard outlet temperature that is greater than the guard inlet temperature due to the predominant exothermic reactions that occur in the guard bed reactor 30. In the guard bed reactor 30, most of the hydrodemetallation and hydrodeoxygenation, including hydrodecarbonylation and hydrodecarboxylation, reactions will occur with some denitrogenation and desulfurization occurring. Metals removed include alkali metals and alkali earth metals and phosphorous.

The contacted biorenewable feed stream in the contacted feed line 36 may be heated and charged to the hydrotreating reactor 32. The hydrotreating reactor 32 may have a bed of hydrotreating catalyst to further hydrodemetallate, hydrodeoxygenate, including hydrodecarbonylate and hydrodecarboxylate, hydrodenitrogenate and hydrodesulfurize the contacted biorenewable feed stream. The heated, contacted biorenewable feed stream may be charged to the hydrotreating reactor 32 at a hydrotreating temperature that may range from about 343° C. (650° F.) to about 427° C. (800° F.) and suitably no more than about 400° C. (752° F.).

In the hydrotreating reactor 32, the heated, contacted biorenewable feed stream is contacted with a hydrotreating catalyst in the presence of a reactor hydrotreating hydrogen stream from line 38 at hydrotreating conditions to saturate the olefinic or unsaturated portions of the n-paraffinic chains in the biorenewable feedstock. The hydrotreating catalyst also catalyzes hydrodeoxygenation reactions including hydrodecarboxylation and hydrocarbonylation reactions to remove oxygenate functional groups from the biorenewable feedstock molecules which are converted to water and carbon oxides. The hydrotreating catalyst also catalyzes desulfurization of organic sulfur and denitrogenation of organic nitrogen in the biorenewable feedstock. Essentially, the hydrotreating reaction removes heteroatoms from the hydrocarbons and saturates olefins in the feed stream. The hydrotreating catalyst may be provided in one, two or more beds and employ interbed hydrogen quench streams from the hydrogen quench stream from the reactor hydrotreating hydrogen stream in line 38.

The hydrotreating catalyst may comprise nickel, nickel/molybdenum, or cobalt/molybdenum dispersed on a high surface area support such as alumina. Suitable hydrotreating catalysts include BDO 200 or BDO 300 available from UOP LLC in Des Plaines, Illinois Hydrotreating catalyst should be in sulfided form. Hydrogen sulfide from the reactor hydrotreating hydrogen stream in line 38 may provide sulfur for catalyst sulfidation. The hydrogen sulfide concentration in the hydrotreating reactor may be higher than in the guard bed reactor due to hydrogen sulfide generated in the guard bed reactor 30 and transported to the hydrotreating reactor in line 36 in addition to the hydrogen sulfide provided in reactor hydrotreating hydrogen stream in line 38.

Generally, hydrotreating conditions include a pressure of about 700 kPa (100 psig) to about 21 MPa (3000 psig).

In an embodiment, the hydrotreating reactor 32 may comprise a hydrotreating section 40 and a hydroisomerization section. 44. The hydrotreating section 44 may comprise one or more beds of hydrotreating catalyst.

A hydrotreated stream produced in the hydrotreating section 40 comprises a hydrocarbon fraction which has a substantial n-paraffin concentration. Oxygenate concentration in the hydrocarbon fraction is essentially nil, whereas the olefin concentration is substantially reduced relative to the contacted biorenewable feed stream. The organic sulfur concentration in the hydrocarbon fraction may be no more than 500 wppm and the organic nitrogen concentration in the hydrocarbon fraction may be no more than 10 wppm. Although this hydrocarbon fraction is useful as a diesel fuel because it comprises a substantial concentration of n-paraffins from the biorenewable feedstock, it will have poor cold flow properties. The hydrotreated stream can be contacted with an isomerization catalyst under isomerization conditions to at least partially isomerize the n-paraffins to isoparaffins, as hereinafter described.

In a two-stage configuration, the hydrotreated stream would have the hydrocarbon fraction separated from gas fraction perhaps in an enhanced hot separator with the hydrocarbon fraction forwarded to the hydroisomerization section 44. In a single stage configuration shown in FIG. 1, the hydrocarbon fraction and the gas fraction are sent to the hydroisomerization section 44 together.

To improve the cold flow properties, the hydrotreated stream may be contacted with a hydroisomerization catalyst in a hydroisomerization section 44 under hydroisomerization conditions to hydroisomerize the normal paraffins to branched paraffins. The hydrotreated liquid stream may be hydroisomerized over a hydroisomerization catalyst in the presence of the hydrotreating hydrogen stream provided by line 38.

The hydroisomerization, also known as hydrodewaxing, of the normal hydrocarbons in the hydroisomerization section 44 can be accomplished over one or more beds of hydrodewaxing catalyst, and the hydrodewaxing may be operated in a co-current mode of operation.

In various embodiments, the hydrodewaxing catalyst used according to the disclosure in a single stage unit as shown in FIG. 1 is tolerant of the presence of sulfur and/or nitrogen during processing. Suitable catalysts can include ZSM-48, SAPO-11 or ZSM-23. Other suitable catalysts can include 1-dimensional 10-member ring molecular sieve. In still other embodiments suitable catalysts can include EU-2, EU-11, or ZBM-30. It is also noted that ZSM-23 with a silica to alumina ratio between about 20 to 1 and about 40 to 1 is sometimes referred to as SSZ-32.

Molecular sieve crystals as part of a catalyst may be used with a metal hydrogenation component. Metal hydrogenation components may be from Groups 6-12 of the Periodic Table based on the IUPAC system having Groups 1-18, preferably Groups 6 and 8-10. Group VIII metals are particularly advantageous with the hydrodewaxing catalysts of the instant disclosure. Examples of such metals include Ni, Mo, Co, W, Mn, Cu, Zn or Ru. Mixtures of hydrogenation metals may also be used such as Co/Mo, Ni/Mo and Ni/W. The amount of hydrogenation metal or metals may range from 0.1 to 5 wt. %, based on catalyst. Methods of loading metal onto ZSM-48 or other molecular sieve catalyst are well known and include, for example, impregnation of the crystal with a metal salt of the hydrogenation component and heating. The catalyst containing hydrogenation metal may also be sulfided prior to use. Non-noble hydrogenation metals enable the hydrodewaxing catalyst to be used in the presence of hydrogen sulfide and ammonia without unduly impacting activity. Non-noble hydrogenation metals on hydrodewaxing catalyst can be essential in a one-stage hydrotreating section 25 and useful in a two-stage hydrotreating section 25.

Preferably, the hydrodewaxing catalysts used in processes according to the disclosure are catalysts with a low ratio of silica to alumina. For example, for ZSM-48, the ratio of silica to alumina in the molecular sieve can be less than 200:1, or less than 110:1, or less than 100:1, or less than 90:1, or less than 80:1. In preferred embodiments, the ratio of silica to alumina can be from 30:1 to 200:1, 60:1 to 110:1, or 70:1 to 100:1.

The hydrodewaxing catalysts useful in processes according to the disclosure can be self-bound or include a binder. In some embodiments, the hydrodewaxing catalysts used in process according to the disclosure are formulated using a low surface area binder, a low surface area binder represents a binder with a surface area of 100 $m^2/g$ or less, or 80 $m^2/g$ or less, or 70 $m^2/g$ or less, or 60 $m^2/g$ or less, or 50 $m^2/g$ or less, or 40 $m^2/g$ or less, or 30 $m^2/g$ or less.

Alternatively, the binder and the molecular sieve particle size is selected to provide a catalyst with a desired ratio of micropore surface area to total surface area. In hydrodewaxing catalysts used according to the disclosure, the micropore surface area corresponds to surface area from the unidimensional pores of molecular sieves in the hydrodewaxing catalyst. The total surface corresponds to the micropore surface area plus the external surface area. Any binder used in the catalyst will not contribute to the micropore surface area and will not significantly increase the total surface area of the catalyst. The external surface area represents the balance of the surface area of the total catalyst minus the micropore surface area. Both the binder and molecular sieve can contribute to the value of the external surface area. Preferably, the ratio of micropore surface area to total surface area for a hydrodewaxing catalyst will be equal to or greater than 25%, or equal to or greater than 30%, or equal to or greater than 35%, or equal to or greater than 40%.

A molecular sieve can be combined with binder in any convenient manner. For example, a bound catalyst can be produced by starting with powders of both the molecular sieve and binder, combining and mulling the powders with added water to form a mixture, and then extruding the mixture to produce a bound catalyst of a desired size. Extrusion aids can also be used to modify the extrusion flow properties of the molecular sieve and binder mixture. The amount of framework alumina in the catalyst may range from 0.1 to 2.7 wt %, or 0.2 to 2 wt %, or 0.3 to 1 wt %.

In yet another embodiment, a binder composed of two or more metal oxides can also be used. In such an embodiment, the weight percentage of the low surface area binder is preferably greater than the weight percentage of the higher surface area binder.

Alternatively, if both metal oxides used for forming a mixed metal oxide binder have a sufficiently low surface area, the proportions of each metal oxide in the binder are less important. When two or more metal oxides are used to form a binder, the two metal oxides can be incorporated into the catalyst by any convenient method. For example, one binder can be mixed with the molecular sieve during formation of the molecular sieve powder, such as during spray drying. The spray dried molecular sieve/binder powder can then be mixed with the second metal oxide binder prior to extrusion.

In one form the of the present disclosure, the catalytic hydrodewaxing catalyst includes from 0.1 wt % to 2.7 wt % framework alumina, 0.1 wt % to 5 wt % Pt, 200:1 to 30:1 $SiO_2:Al_2O_3$ ratio and at least one low surface area, refractory metal oxide binder with a surface area of 100 $m^2/g$ or less. This noble metal catalyst would be more appropriate for a two-stage unit in which a hydroisomerization hydrogen stream lacking hydrogen sulfide is charged to the hydroisomerization reactor.

One example of a molecular sieve suitable for use in the claimed disclosure is ZSM-48 with a $SiO_2:Al_2O_3$ ratio of from about 70 to about 110. In the embodiments below, ZSM-48 crystals will be described variously in terms of "as-synthesized" crystals that still contain the (200:1 or less $SiO_2:Al_2O_3$ ratio) organic template; calcined crystals, such as Na-form ZSM-48 crystals; or calcined and ion-exchanged crystals, such as H-form ZSM-48 crystals.

The ZSM-48 crystals after removal of the structural directing agent have a particular morphology and a molar composition according to the general formula: (n) $SiO_2$: $Al_2O_3$ where n is from 70 to 110. In still other embodiments, Si may be replaced by Ge and Al may be replaced by Ga, B, Fe, Ti, V, and Zr.

The as-synthesized form of ZSM-48 crystals is prepared from a mixture having silica, alumina, base and hexamethonium salt directing agent. In an embodiment, the molar ratio of structural directing agent:silica in the mixture is less than 0.05. In another embodiment, the molar ratio of structural directing agent:silica in the mixture is at least 0.01. In an embodiment, the as-synthesized form of ZSM-48 crystals has a silica:alumina molar ratio of 70 to 110. For any given preparation of the as-synthesized form of ZSM-48 crystals, the molar composition will contain silica, alumina and directing agent. It should be noted that the as-synthesized form of ZSM-48 crystals may have molar ratios slightly different from the molar ratios of reactants of the reaction mixture used to prepare the as-synthesized form. This result may occur due to incomplete incorporation of 100% of the reactants of the reaction mixture into the crystals formed (from the reaction mixture).

The ZSM-48 composition is prepared from an aqueous reaction mixture comprising silica or silicate salt, alumina or soluble aluminate salt, base and directing agent. To achieve the desired crystal morphology, the reactants in reaction mixture have the following molar ratios: $SiO_2:Al_2O_3$=70 to 110; $H_2O:SiO_2$=1 to 500; OH—:$SiO_2$=0.1 to 0.3; template: $SiO_2$=0.01-0.05.

The silica source is precipitated silica commercially available from Degussa. The alumina may be in the form of a soluble salt, preferably the sodium salt and is commercially available from US Aluminate. Other suitable aluminum sources include other aluminum salts such as the chloride, aluminum alcoholates or hydrated alumina such as gamma alumina, pseudobohemite and colloidal alumina. The base used to dissolve the metal oxide can be any alkali metal hydroxide, preferably sodium or potassium hydroxide, ammonium hydroxide, diquaternary hydroxide and the like. The directing agent is a hexamethonium salt such as hexamethonium dichloride or hexamethonium hydroxide. The anion (other than chloride) could be other anions such as hydroxide, nitrate, sulfate, other halide and the like. Hexamethonium dichloride is N,N,N,N',N',N'-hexamethyl-1,6-hexanediammonium dichloride.

In an embodiment, the crystals obtained from the synthesis according to the disclosure have a morphology that is free of fibrous morphology. Fibrous morphology is not desired, as this crystal morphology inhibits the catalytic hydrodewaxing activity of ZSM-48. In another embodiment, the crystals obtained from the synthesis according to the disclosure have a morphology that contains a low percentage of needle-like morphology. The amount of needle-like morphology present in the ZSM-48 crystals can be 10% or less. Low amounts of needle-like crystals are preferred for some applications as needle-like crystals are believed to reduce the activity of ZSM-48 for some types of reactions. To obtain a desired morphology in high purity, the ratios of silica:alumina, base:silica and directing agent:silica in the reaction mixture according to embodiments of the disclosure should be employed. Additionally, if a composition free of Kenyaite and/or free of needle-like morphology is desired, the preferred ranges should be used.

The as-synthesized ZSM-48 crystals should be at least partially dried prior to use or further treatment. Drying may be accomplished by heating at temperatures of from 100 to 400° C. Pressures may be atmospheric or subatmospheric. If drying is performed under partial vacuum conditions, the temperatures may be lower than those at atmospheric pressures.

Catalysts are typically bound with a binder or matrix material prior to use. Binders are resistant to temperatures of the use desired and are attrition resistant. Binders may be catalytically active or inactive and include other zeolites, other inorganic materials such as clays and metal oxides such as alumina, silica, titania, zirconia, and silica-alumina. Clays may be kaolin, bentonite and montmorillonite and are commercially available. They may be blended with other materials such as silicates. Other porous matrix materials in addition to silica-aluminas include other binary materials such as silica-magnesia, silica-thoria, silica-zirconia, silica-beryllia and silica-titania as well as ternary materials such as silica-alumina-magnesia, silica-alumina-thoria and silica-alumina-zirconia. The matrix can be in the form of a co-gel. The bound ZSM-48 framework alumina will range from 0.1 wt % to 2.7 wt % framework alumina.

High purity ZSM-48 crystals made according to the above embodiments have a relatively low silica:alumina ratio. This lower silica:alumina ratio means that the present catalysts are more acidic. In spite of this increased acidity, they have superior activity and selectivity as well as excellent yields. They also have environmental benefits from the standpoint of health effects from crystal form and the small crystal size is also beneficial to catalyst activity.

For catalysts according to the disclosure that incorporate ZSM-23, any suitable method for producing ZSM-23 with a low $SiO_2$:$Al_2O_3$ ratio may be used. U.S. Pat. No. 5,332,566 provides an example of a synthesis method suitable for producing ZSM-23 with a low ratio of $SiO_2$:$Al_2O_3$. For example, a directing agent suitable for preparing ZSM-23 can be formed by methylating iminobispropylamine with an excess of iodomethane. The methylation is achieved by adding the iodomethane dropwise to iminobispropylamine which is solvated in absolute ethanol. The mixture is heated to a reflux temperature of 77° C. for 18 hours. The resulting solid product is filtered and washed with absolute ethanol.

The directing agent produced by the above method can then be mixed with colloidal silica sol (30% $SiO_2$), a source of alumina, a source of alkali cations (such as Na or K), and deionized water to form a hydrogel. The alumina source can be any convenient source, such as alumina sulfate or sodium aluminate. The solution is then heated to a crystallization temperature, such as 170° C., and the resulting ZSM-23 crystals are dried. The ZSM-23 crystals can then be combined with a low surface area binder to form a catalyst according to the disclosure.

Hydroisomerization conditions generally include a temperature of about 150° C. (302° F.) to about 450° C. (842° F.) and a pressure of about 1724 kPa (abs) (250 psia) to about 13.8 MPa (abs) (2000 psia). In another embodiment, the hydroisomerization conditions include a temperature of about 300° C. (572° F.) to about 360° C. (680° F.) and a pressure of about 3102 kPa (abs) (450 psia) to about 6895 kPa (abs) (1000 psia).

A hydrotreated stream in a hydrotreated line 46 from the isomerization section 44 is a branched-paraffin-rich stream that preferably comprises greater than 50 mass-% branched paraffins of the total paraffin content. It is envisioned that the hydroisomerized effluent may contain 70, 80, or 90 mass-% branched paraffins of the total paraffin content. Only minimal branching is required, enough to improve the cold-flow properties of the hydrotreated hot liquid stream to meet specifications. Hydroisomerization conditions are selected to avoid undesirable cracking, so the predominant product in the hydroisomerized stream in the hydrotreated line 46 is a mono-branched paraffin.

The hydrotreated stream comprises hydrogen, hydrogen sulfide and carbon oxides in addition to the hydrocarbons. The hydrotreated stream in the hydrotreated line 46 may first flow to a hydrotreated effluent heat exchanger 48 to heat the cold hydrotreated liquid stream in the cold hydrotreated liquid line 50 and cool the hydrotreated stream. As previously described, the cooled hydrotreated stream in the hydrotreated line 46 may then be heat exchanged with the combined biorenewable feed stream in the combined feed effluent exchanger 24 to cool the hydrotreated stream in the hydrotreated line 46 and heat the combined biorenewable feed stream in line 22. The cooled hydrotreated steam in the hydrotreated line 46 may be then further cooled in the steam generator 52 to generate steam.

The hydrotreated stream which is primarily cooled is separated into a hydrotreated liquid stream comprising distillate range hydrocarbons and a hydrotreated gas stream comprising hydrogen, carbon oxides and hydrogen sulfide. The separation can be performed in various ways into more than one hydrotreated liquid stream and more than one hydrotreated gas stream.

The hydrotreated stream may be separated in a hot separator 54 to provide a hydrocarbonaceous, hot hydrotreated gas stream in a hot overhead line 56 and a hydrocarbonaceous, hot hydrotreated liquid stream in a hot bottoms line 58. The hot separator 54 may be in downstream communication with the hydrotreating reactor 32. The hot separator 54 operates at about 177° C. (350° F.) to about 371° C. (700° F.) and preferably operates at about 232° C. (450° F.) to about 315° C. (600° F.). The hot separator 54 may be operated at a slightly lower pressure than the hydrotreating reactor 32 accounting for pressure drop through intervening equipment. The hot separator 54 may be operated at pressures between about 3.4 MPa (gauge) (493 psig) and about 20.4 MPa (gauge) (2959 psig). The hot hydrotreated vapor stream in the hot overhead line 56 may have a temperature of the operating temperature of the hot separator 54.

The hot liquid stream in the hot bottoms line 58 may be pumped and split into two streams: a process liquid stream in a process line 60 taken from the hot liquid stream in the hot bottoms line 58 and the hot recycle liquid stream in the recycle line 20 also taken from the hot hydrotreated liquid stream in the hot bottoms line 58. The hot recycle liquid stream in the recycle line 20 may be combined with the biorenewable feed stream in line 12 as previously described.

The process liquid stream taken from the hot liquid stream in the process line 60 may be mixed with the hot hydrotreated vapor stream in the hot overhead line 56 to provide a combined hot hydrotreated vapor stream in line 18 and cooled by heat exchange with biorenewable feed stream in line 12 in the hot vapor combined feed heat exchanger 19. The cooled combined hot hydrotreated vapor stream in line 18 may be further cooled and fed to a cold separator 62. The cooled combined hot hydrotreated vapor stream is separated in the cold separator 62 into a cold hydrotreated vapor stream in a cold overhead line 64 comprising hydrogen sulfide, carbon oxides and hydrogen. The hot hydrotreated liquid stream in the combined hot hydrotreated vapor stream in line 18 sponges hydrotreated liquid materials in the vapor to draw them into the cold hydrotreated liquid stream. An aqueous stream can be withdrawn from a boot in the cold separator 62. The cold hydrotreated liquid stream exits the cold separator in the cold bottoms line 66. The cold hydrotreated liquid stream comprises distillate range hydrocarbons and is heated by heat exchange with the stripper bottoms stream in a stripper bottoms line 74 in the stripper bottoms exchanger 65 and the hydrotreated stream in the hydrotreated effluent exchanger 48 and is fed to a recovery section 75 that begins with and is represented by a stripping column 70.

In the stripping column 70, vaporous components such as hydrogen sulfide are stripped from the hydrotreated liquid stream by contact with a stripping gas such as steam fed by line 71 to a bottom of the stripping column 70. The vaporous components will separate and ascend into an overhead line 72 which can be condensed to produce a naphtha stream in an overhead liquid stream 76 while leaving LPG and light gases in a net overhead stream 78. A stripped distillate stream will exit the stripping column in the stripper bottoms line 74. The stripped distillate stream can be recovered as diesel product or transported to further product recovery. Further fractionation of the stripped distillate stream in the stripper bottoms line 74 can produce kerosene/jet range stream and a diesel range stream.

The cold hydrotreated vapor stream in the cold separator overhead line 64 comprises hydrogen, hydrogen sulfide, carbon dioxide, carbon monoxide and some light hydrocarbons. Typically, this cold hydrotreated vapor stream is fed to an acid gas absorption column which contacts the cold hydrotreated vapor stream with an amine solvent to scrub the cold hydrotreated vapor stream of acid gases, so the purified cold hydrotreated vapor stream can be recycled to the hydrotreating section 25 and particularly to the guard bed reactor 30 and/or the hydrotreating reactor 32 to provide hydrogen requirements. Carbon dioxide is an acid gas that is desirably removed from the cold hydrotreated vapor stream before recycling it to the hydrotreating section 25 and particularly to the guard bed reactor 30 and/or the hydrotreating reactor 32. Carbon dioxide can build up in the system and must be removed. Additionally, carbon monoxide is controlled by converting it in a water gas shift reaction to carbon dioxide in the hydrotreating section 25 and particularly to the guard bed reactor 30 and/or the hydrotreating reactor 32. Carbon dioxide concentration has to be controlled to avoid pushing the water gas shift equilibrium too much in favor of carbon monoxide which is not easily removed from the system.

Another acid gas, hydrogen sulfide, is desirably retained in the cold hydrotreated vapor stream that is recycled to the hydrotreating section 25 and particularly to the guard bed 30 and/or the hydrotreating reactor 32. Hydrogen sulfide is advantageous for replenishing sulfur that is stripped from the hydrogenation metals on the hydrotreating catalyst. Sulfur is necessary to keep the hydrogenation metals sulfided and therefore, active. Conventionally, the entire cold hydrotreated gas stream is subjected to scrubbing with a solvent to remove acid gases before any part of it is recycled to the hydrotreating section 25 and particularly to the guard bed reactor 30 and/or the hydrotreating reactor 32. A portion of the cold hydrotreated gas stream around an acid gas removal column and recycle the portion of the cold hydrotreated gas stream to the hydrotreating section 25 and particularly to the guard bed reactor 30 and/or the hydrotreating reactor 32 with all of its hydrogen sulfide.

To effect the bypass, the cold hydrotreated gas stream in the cold overhead line 64 is split into a recycle gas stream in a recycle line 82 and a purge gas stream in a purge line 84. The recycle gas stream and the purge stream each have the same composition, since the streams are taken as aliquots of the cold hydrotreated gas stream in line 64. The purge gas stream can be set on flow control with most of the recycle gas stream bypassing further purification on pressure differential control. A supplemented make-up hydrogen gas stream in line 86 may be added to the recycle gas stream in line 82 to provide a recycle hydrogen stream in line 88. The recycle hydrogen stream is compressed in a compressor 90 to provide the hydrotreating hydrogen stream in line 92 that is recycled to the hydrotreating section 25 and particularly to the guard bed reactor 30 and/or the hydrotreating reactor 32. The supplemented make-up hydrogen gas stream in line 86 has a greater concentration of hydrogen than the recycle gas stream to boost the hydrogen concentration of the hydrotreating hydrogen stream recycled to the hydrotreating section 25 and particularly to the guard bed reactor 30 and/or the hydrotreating reactor 32. All of the recycle gas stream in line 82 is recycled to the hydrotreating section 25 and particularly to the guard bed 30 and/or the hydrotreating reactor 32.

The hydrotreating hydrogen stream in line 92 comprises at least a portion of the cold hydrotreated gas stream in line 64 and the recycle gas stream in line 82. The hydrotreated hydrogen stream in line 92 will comprise about 50 wppm sulfur to about 2000 wppm sulfur, and specifically at least 50 wppm hydrogen sulfide to about 2000 wppm hydrogen sulfide. The hydrotreated hydrogen stream in line 92 will comprise about 100 wppm sulfur to about 1500 wppm sulfur and specifically at least about 100 wppm to about 1500 wppm hydrogen sulfide. The hydrotreated hydrogen stream in line 92 will comprise at least 400 wppm to about 1000 wppm sulfur and specifically about 400 to about 1000 wppm hydrogen sulfide.

The purge stream in line 84 may comprise about 1 to about 50 wt %, and preferably about 5 to about 25 wt %, of the cold hydrotreated gas stream. In an aspect, the purge stream may be about 5 to about 15 wt % of the cold hydrotreated gas stream in line 64. The balance of the cold hydrotreated gas stream may be the recycle gas stream in line 82. The amount of the purge gas stream can be selected to ensure that the concentration of carbon monoxide in the hydrotreating hydrogen stream is below about 1 wt % or below about 2 wt %.

The purge gas stream in the purge gas line 84 may be purified in a purification unit 105 to increase a hydrogen concentration of the purge gas stream. In an embodiment, the purification unit 105 may contact the purge gas stream with an absorbent stream to absorb impurities from the purge gas stream to provide an absorbed purified gas stream. The purification unit 105 may comprise an absorption column 100 that absorbs acid gases from the purge gas stream. The purge gas stream in line 84 may be passed through a trayed or packed absorption column 100 in which it is scrubbed with an absorbent stream added by line 102.

The absorbent stream may be an aqueous alkaline solution which absorbs acid gases including hydrogen sulfide and carbon dioxide by extracting them into solution. Preferred absorbent liquids include Selexol available from UOP LLC in Des Plaines, Illinois and amines such as alkanolamines including diethanol amine (DEA), monoethanol amine (MEA), methyl diethanol amine (MDEA), diisopropanol amine (DIPA), and diglycol amine (DGA). Other absorbent liquids can be used in place of or in addition to the preferred amine absorbent liquids. The lean absorbent stream countercurrently contacts the purge gas stream and absorbs acid gas contaminants such as hydrogen sulfide and carbon dioxide.

The resultant absorbed purified gas stream is taken out from an overhead outlet of the absorption column 100 in an absorber overhead line 104, and a rich absorbent stream is taken out from the bottoms at a bottom outlet of the absorption column 100 in an absorbent bottoms line 108. The spent absorbent stream from the bottoms may be regenerated and recycled back to the absorbent column 100 in the absorbent line 102. The absorbed purified gas stream in the absorber overhead line 104 comprises about 1 to about 3 mol % carbon monoxide, about 0.5 to about 2 mol-% methane and about 1 to about 5 mol % ethane and a hydrogen concentration of below about 94 mol %.

The absorption column 100 may be operated with a gas inlet temperature between about 38° C. (100° F.) and about 66° C. (150° F.) and an overhead pressure of about 3 MPa (gauge) (435 psig) to about 5.5 MPa (800 psia). The temperature of the purge gas stream to the absorption column 100 may be between about 20° C. (68° F.) and about 80° C. (176° F.) and the temperature of the absorbent stream in the absorbent line 102 may be between about 20° C. (68° F.) and about 70° C. (158° F.).

In an embodiment, the absorbed purified gas stream in the absorber overhead line 104 may be added to the recycle gas stream in line 82 to improve the hydrogen concentration of the recycle hydrogen stream 88 and the hydrotreating hydrogen stream in line 92 recycled to the hydrotreating section 25 and particularly to the guard bed 30 and/or the hydrotreating reactor 32. The absorbed purified gas stream in the absorber overhead line 104 is transported in an absorbed recycle line 103 to be mixed with the make-up gas in line 120 to provide the supplemented make-up gas in line 86 which is mixed with the recycle gas 82. A control valve on line 103 can render this embodiment inoperative or operative. In this embodiment, the hydrotreating hydrogen stream concentration may have a hydrogen concentration of at least above 85 wt % with a build-up of carbon monoxide of no more than about 0.5 to about 2.5 mol %. Make-up gas is provided from line 122 which may be compressed in a make-up gas compressor 121.

In an alternative embodiment, as further shown in FIG. 1, the purification unit 105 includes a solid media purification unit 110. The absorbed purified gas stream in the absorber overhead line 104 may be transported in line 106 to be further purified in the solid media purification unit 110 by contact with a solid media to remove impurities from the absorbed purified gas stream to provide a contacted purified gas stream Further purification of the absorbed purified gas stream may be conducted in a solid media purification unit 110 that utilizes a solid media to remove impurities from the absorbed purified gas stream. At least a portion of the cold hydrotreated gas stream in line 64 is contacted with a solid media to remove impurities to provide a contacted purified gas stream in line 118. The solid media purification unit 110 that utilizes solid media to remove impurities can be a pressure swing adsorption unit, a temperature swing adsorption unit or a membrane unit.

The solid media purification unit 110 is preferably a pressure swing adsorption (PSA) unit 112. In the PSA unit 110, the absorbed purified gas stream in line 106 may be fed to the PSA unit 110 in which hydrogen passes by the adsorbent in a plurality of beds 114 while larger molecules such as impurities, carbon monoxide, carbon dioxide, hydrogen sulfide and hydrocarbons, adsorb onto the adsorbent in the beds.

The exemplary PSA unit 110 operates on the principle of selectively adsorbing hydrocarbons and impurities, such as carbon monoxide, hydrogen sulfide and/or nitrogen, onto the adsorbent at a relatively high pressure, such as about 1,920 to about 5,520 kPa gauge to form the contacted purified gas stream 118, and desorbing the hydrocarbons and impurities from the adsorbent at relatively low pressure, such as about 7 to about 840 kPa gauge to regenerate the adsorbent and to form a tail gas impurity rich stream 116 that contains the hydrocarbons and/or other impurities, such as carbon monoxide and hydrogen sulfide.

In an exemplary embodiment, the PSA unit 110 includes a plurality of fixed adsorbent beds 114 containing the solid media which is the adsorbent. Each adsorbent bed 114 contains layers of different adsorbent materials where a lower layer or layers are filled with weaker adsorbent materials that have relatively low affinity for adsorbing gaseous hydrocarbons, and an upper layer or layers are filled with stronger adsorbent materials that have a relatively high affinity for adsorbing gaseous hydrocarbons and impurities. For example, the lower layer(s) can contain weakly adsorbent materials, such as activated alumina and/or silica gel, while the intermediate layer(s) can contain intermediate strength adsorbent materials, such as activated carbon, and the upper layer(s) can contain strong adsorbent materials, such as zeolite and/or molecular sieve materials.

In an exemplary embodiment, the multiple fixed-bed adsorption units cooperatively operate in a staggered sequence to constantly feed the absorbed purified gas stream in line 104 and produce the contacted purified gas stream in line 118 and the impurity rich tail gas stream in line 116. In an exemplary embodiment, the PSA unit 110 operates following a five-step pressure-swing cycle including an adsorption step, a co-current depressurization step, a counter-current depressurization step, a purge step, and a repressurization step. The adsorbent beds 114 may be connected in series to cycle between pressures. During the adsorption step, the absorbed purified gas stream 106 enters a lower portion of the fixed-bed adsorption unit at a relatively high pressure, and as the feed gas rises in the unit, the hydrocarbons and impurities (e.g., carbon monoxide and/or hydrogen sulfide) are adsorbed in the various layers of the adsorbent materials depending upon their respective adsorption selectivity to form the contacted purified gas stream in line 118. The co-current depressurization, counter-current depressurization and purge steps decrease the pressure in the fixed-bed adsorption unit and purge the unit with high purity gas from the contacted purified gas stream in line 118 or co-current depressurization steps, respectively, to remove the hydrocarbons and impurities and regenerate the adsorption materials. Flow to each adsorbent bed 114 is periodically terminated and the pressure in the terminated bed is decreased in stages to release void space gas and then to blow down. A blow down pressure of about 7 kPa (1 psig) to about 1034 kPa (150 psig), suitably to about 840 kPa (120 psig), may be used to desorb hydrogen from the adsorbent. Depressurization or blow down desorbs adsorbed impurities from the adsorbent in the bed and pass it into the tail gas impurity rich stream in line 116. The repressurization step increases the pressure in the fixed-bed adsorption unit with either feed gas from the absorbed purified gas stream in line 106 or contacted purified gas stream in line 118 in preparation for the next adsorption step. Other pressure swing adsorption configurations may be used.

An impurity rich stream rich in carbon oxides, hydrogen sulfide and light hydrocarbons exits the PSA unit 112 in a tail gas line 116. The tail gas impurity rich stream in line 116 may be fed to a stripper column 70 of the product recovery section 75 along with the cold hydrotreated liquid stream in line 66 to recover light hydrocarbons, typically in the stripper overhead line 72. About 70 to about 94 mol % of the hydrogen fed to the PSA unit 112 may be recovered in the contacted purified gas stream in line 118 at a purity of between about 90 and about 99.9 mol %. At a blow down pressure of about 689 kPa (100 psig) to about 1034 kPa (150 psig), about 70 to about 75 mol % hydrogen recovery can be achieved from the purge gas stream fed to the PSA unit 112.

The PSA unit 110 produces a contacted purified gas stream in a purified gas line 118. The contacted purified gas stream in line 118 may be mixed with the recycle gas stream in line 82 to increase the hydrogen concentration in the recycle gas stream recycled to the hydrotreating section 25 and particularly to the guard bed reactor 30 and/or the hydrotreating reactor 32. The contacted purified gas stream in line 118 may have at least 98 mol % hydrogen, suitable at least 99 mol % hydrogen and preferably at least 99.9 mol % hydrogen at 3.5 MPa (500 psia) to about 5.5 MPa (800 psia). In an aspect, the contacted purified gas stream in line 118 may supplement a make-up gas stream in line 120 which has a similar hydrogen concentration and pressure. The make-up gas in line 120 may be provided from the make-up gas header in line 122 and undergo one or two stages of compression before it is supplemented with the contacted purified gas stream in line 118 to provide the supplemented make-up gas stream in line 86. The supplemented make-up gas stream in line 86 may then be mixed with the recycle gas stream and compressed in the recycle gas compressor to provide the hydrotreating hydrogen stream in line 92. In an aspect, the make-up gas stream in line 120 is mixed with the purified gas stream in line 118 and the recycle gas stream in line 82.

The hydrotreating hydrogen stream may be provided in three branches: a feed hydrotreating hydrogen stream in line 16, a guard bed hydrotreating hydrogen stream in line 34 and a reactor hydrotreating hydrogen stream in line 38. The hydrotreating hydrogen stream comprises at least 60 wt % hydrogen, suitably at least 80 wt % hydrogen, more suitably at least 92 wt % hydrogen, preferably at least 94 wt % hydrogen, and less than 1 mol % carbon monoxide and hydrogen sulfide as previously stated to maintain sulfidation of the hydrotreating catalyst in the guard bed reactor 30 and the hydrotreating reactor 32 in the hydrotreating reactor section 25. The hydrogen sulfide in the recycle gas stream recycled to the reactor permits reduction or elimination of any sulfur addition into the biorenewable feed stream 12. Additionally, reduced flow rate to the absorption column 100 reduces the capacity and the absorbent rate to the absorption column decreasing operational and capital expenses.

The compressed hydrotreating hydrogen stream in line 92 supplies hydrogen to the hydrotreating hydrogen stream in the hydrotreating hydrogen line 16, the guard bed hydrogen stream in the guard bed hydrogen line 34 and the reactor hydrogen stream in the reactor hydrogen line 38. The greater the proportion of the purge gas stream relative to the recycle gas stream results in a greater proportion of supplemented make-up gas that must be mixed with the recycle gas and recycled to the hydrotreating section 25 and particularly to the guard bed reactor 30 and/or the hydrotreating reactor 32. However, the use of a solid media gas purification unit 110 to increase the hydrogen purity of the absorbed purified gas stream enables reduction of the make-up gas rate in line 120 to the extent that the contacted purified gas stream in line 118 provides make-up gas in line 86 to be mixed with the recycle gas in line 82.

Figure 2:
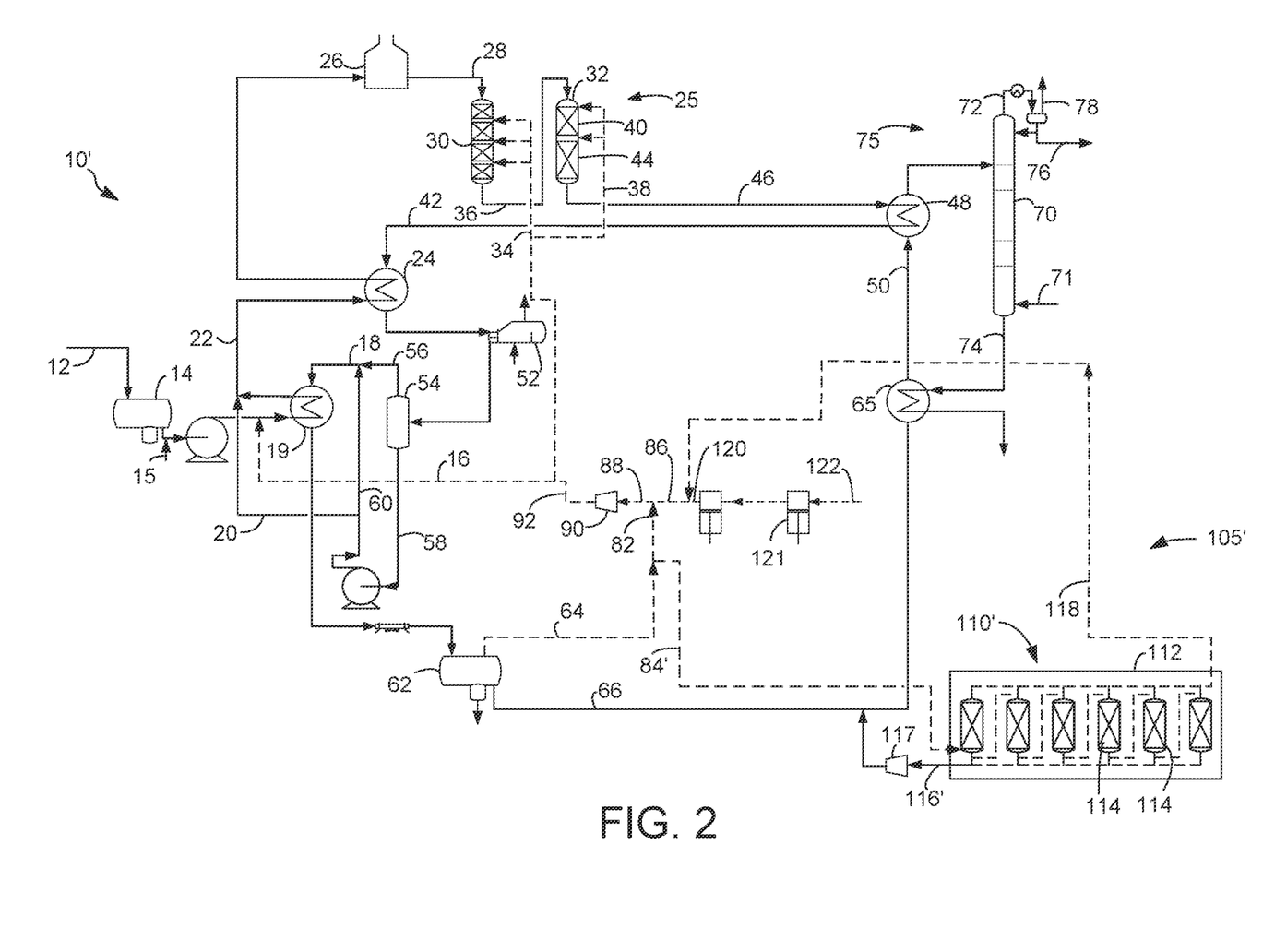
FIG. 2 is a simplified process flow diagram of an alternative embodiment of FIG. 1.

In an alternative embodiment to FIG. 1, the absorption column 100 of FIG. 1 can be eliminated and supplanted by a gas purification unit 110 as shown in FIG. 2. Elements in FIG. 2 with the same configuration as in FIG. 1 will have the same reference numeral as in FIG. 1. Elements in FIG. 2 which have a different configuration as the corresponding element in FIG. 1 will have the same reference numeral but designated with a prime symbol ('). The configuration and operation of the embodiment of FIG. 2 is essentially the same as in FIG. 1 with the exceptions noted as follows.

According to a process 10', the purge gas stream in a purge gas line 84' feeds a purification unit 105' that does not include an absorption column but only includes a solid media gas purification unit 110'. The purge gas stream in line 84' is directly contacted with a solid media to remove impurities from the purge gas stream to provide a contacted purified gas stream 118. In one example, the solid media gas purification unit 110 may be a PSA unit 112. The PSA unit 112 operates as described for the embodiment of FIG. 1 except that the purge gas stream in line 84' feeds the PSA unit 112 directly. At a blow down pressure of about 689 kPa (100 psig) to about 1034 kPa (150 psig) about 70 to about 75 mol % hydrogen recovery can be achieved from the purge gas stream fed to the PSA unit 112. As a result, the tail gas impurity rich stream exits at a pressure that enables it to enter the recovery section 75 via the stripping column 70. To maximize hydrogen recovery, the tail gas impurity rich stream in line 116 would be taken at even lower blowdown pressure such as at about 7 kPa (1 psig) to about 35 kPa (5 psig) to obtain at least about 92 mol % of the hydrogen in the purge gas stream at a purity of about 90 to about 99 mol %.

The low pressure of the tail gas enables greater removal of light hydrocarbons such as LPG and naphtha in the tail gas impurity rich stream from the purge gas stream but does not allow the tail gas to enter the stripping column 70 of the recovery section 75. Hence, a tail gas compressor 117 may be installed on the tail gas impurity rich line 116' so LPG and naphtha can be recovered in the product recovery section 75 and particularly in the stripper column 70. The tail gas compressor may boost pressure of the tail gas impurity rich stream to 689 kPa (100 psig) to about 1034 kPa (150 psig) to enable it to enter the stripper column 70 in the product recovery section 75. The tail gas impurity rich stream in line 116' and the cold hydrotreated gas stream may be transported to the stripper column 70 together in line 50.

Alternatively, instead of feeding the tail gas impurity rich stream in line 116' to the product recovery section 75, it can be fed to a fire box (not shown) to be combusted. The tail gas impurity rich stream can alternatively be first fed to an absorption column similar to the absorption column 100 in FIG. 1 to remove acid gases before being transported to a fuel gas header (not shown). The fuel gas header supplies fuel gas to many refinery needs.

Figure 3:
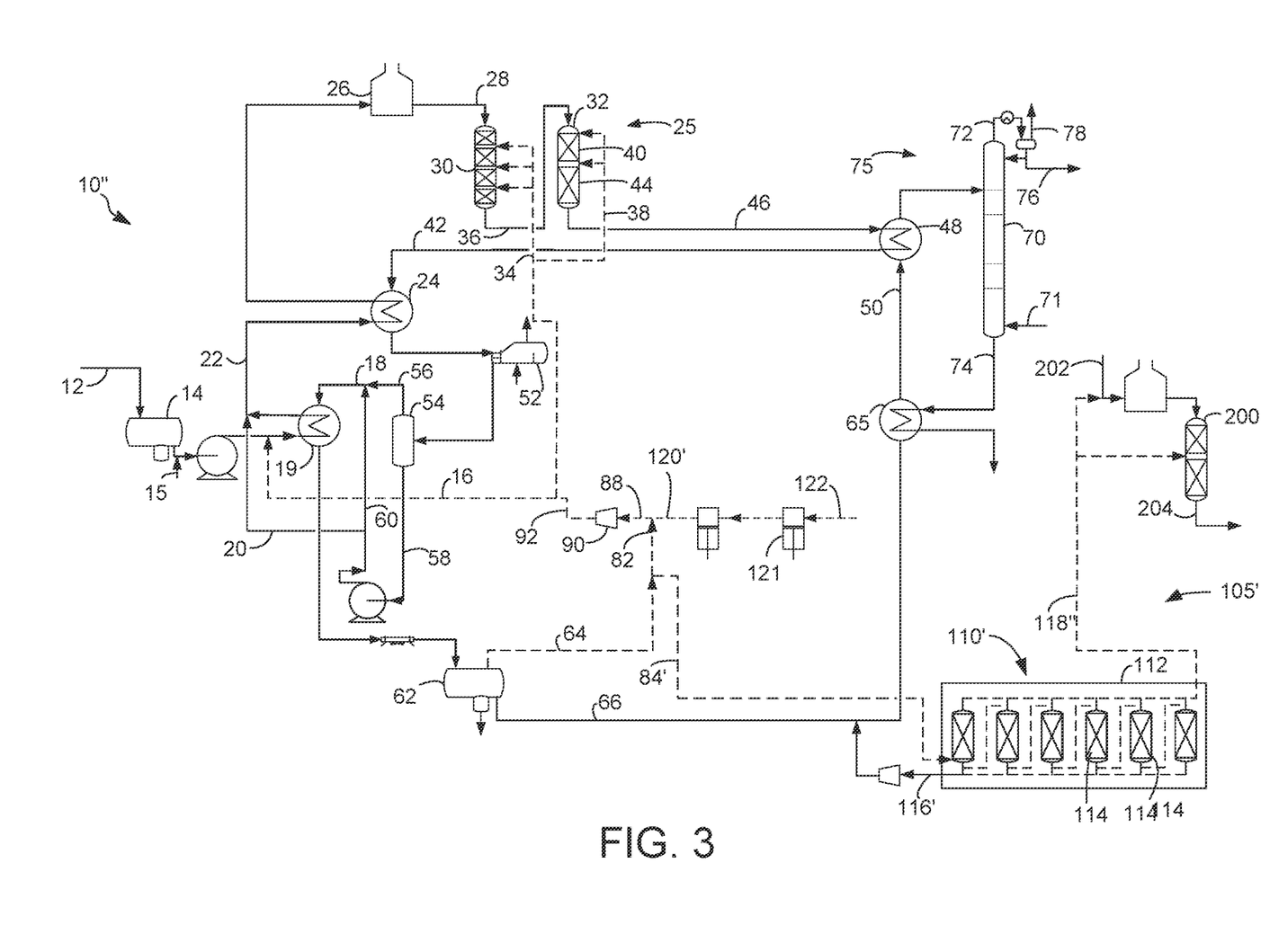
FIG. 3 is a simplified process flow diagram of an alternative embodiment of FIG. 2.

In an alternative embodiment to FIGS. 1 and 2, the contacted purified gas stream in line 118" is transported to a hydrotreating reactor 200 separate from the hydrotreating reactor 32 in the hydrotreating section 25 to provide hydrogen requirements as shown in FIG. 3. Elements in FIG. 3 with the same configuration as in FIG. 1 or 2 will have the same reference numeral as in FIG. 1 or 2, respectively. Elements in FIG. 3 which have a different configuration as the corresponding element in FIG. 1 or 2 will have the same reference numeral but designated with a double prime symbol ("). The configuration and operation of the embodiment of FIG. 3 is essentially the same as in FIG. 2 with the exceptions noted as follows.

In the process 10" of FIG. 3, the contacted purified gas stream 118" instead of supplementing the make-up gas stream 120 is mixed with a hydrocarbon feed stream in line 202, heated and fed to a hydrotreating reactor 200. The purified contacted stream in line 118" comprises less than 1000 wppm carbon monoxide and a hydrogen purity above 85 mol % for sufficient hydrogen partial pressure to serve as an excellent hydrogen gas stream for a distillate hydrotreating reactor 200. The hydrocarbon feed stream is suitably a distillate stream boiling in the diesel boiling range.

A portion of the contacted purified gas stream 118" is used for interbed quench in the hydrotreating reactor 200. The hydrotreating reactor 200 may be a fixed bed reactor that comprises one or more vessels, single or multiple beds of catalyst in each vessel, and various combinations of hydrotreating catalyst in one or more vessels.

Suitable hydrotreating catalysts are any known conventional hydrotreating catalysts and include those which are comprised of at least one Group VIII metal, preferably iron, cobalt and nickel, more preferably cobalt and/or nickel and at least one Group VI metal, preferably molybdenum and tungsten, on a high surface area support material, preferably alumina. Other suitable hydrotreating catalysts include zeolitic catalysts, as well as noble metal catalysts where the noble metal is selected from palladium and platinum. The Group VIII metal is typically present in an amount ranging from about 2 to about 20 wt %, preferably from about 4 to about 12 wt %. The Group VI metal will typically be present in an amount ranging from about 1 to about 25 wt %, preferably from about 2 to about 25 wt %.

Preferred hydrotreating reaction conditions include a temperature from about 290° C. (550° F.) to about 455° C. (850° F.), suitably 316° C. (600° F.) to about 427° C. (800° F.) and preferably 343° C. (650° F.) to about 399° C. (750° F.), a pressure from about 2.8 MPa (gauge) (400 psig) to about 17.5 MPa (gauge) (2500 psig), a liquid hourly space velocity of the fresh hydrocarbonaceous feedstock from about 0.1 $hr^{-1}$, suitably 0.5 $hr^{-1}$, to about 5 $hr^{-1}$, preferably from about 1.5 to about 4 $hr^{-1}$, and a hydrogen rate of about 84 $Nm^3/m^3$ (500 scf/bbl), to about 1,011 $Nm^3/m^3$ oil (6,000 scf/bbl), preferably about 168 $Nm^3/m^3$ oil (1,000 scf/bbl) to about 1,250 $Nm^3/m^3$ oil (7,500 scf/bbl), with a hydrotreating catalyst or a combination of hydrotreating catalysts.

The hydrocarbon feed stream in the hydrocarbon feed line 202 may be hydrotreated with the contacted purified hydrogen stream in line 118" in the hydrotreating reactor 200 to provide a hydrotreated hydrocarbon stream that exits the hydrotreating reactor 200 in a hydrotreated effluent line 204. The hydrotreated effluent stream may be forwarded to a separation section or be taken as a hydrocracking feed stream.

Figure 4:
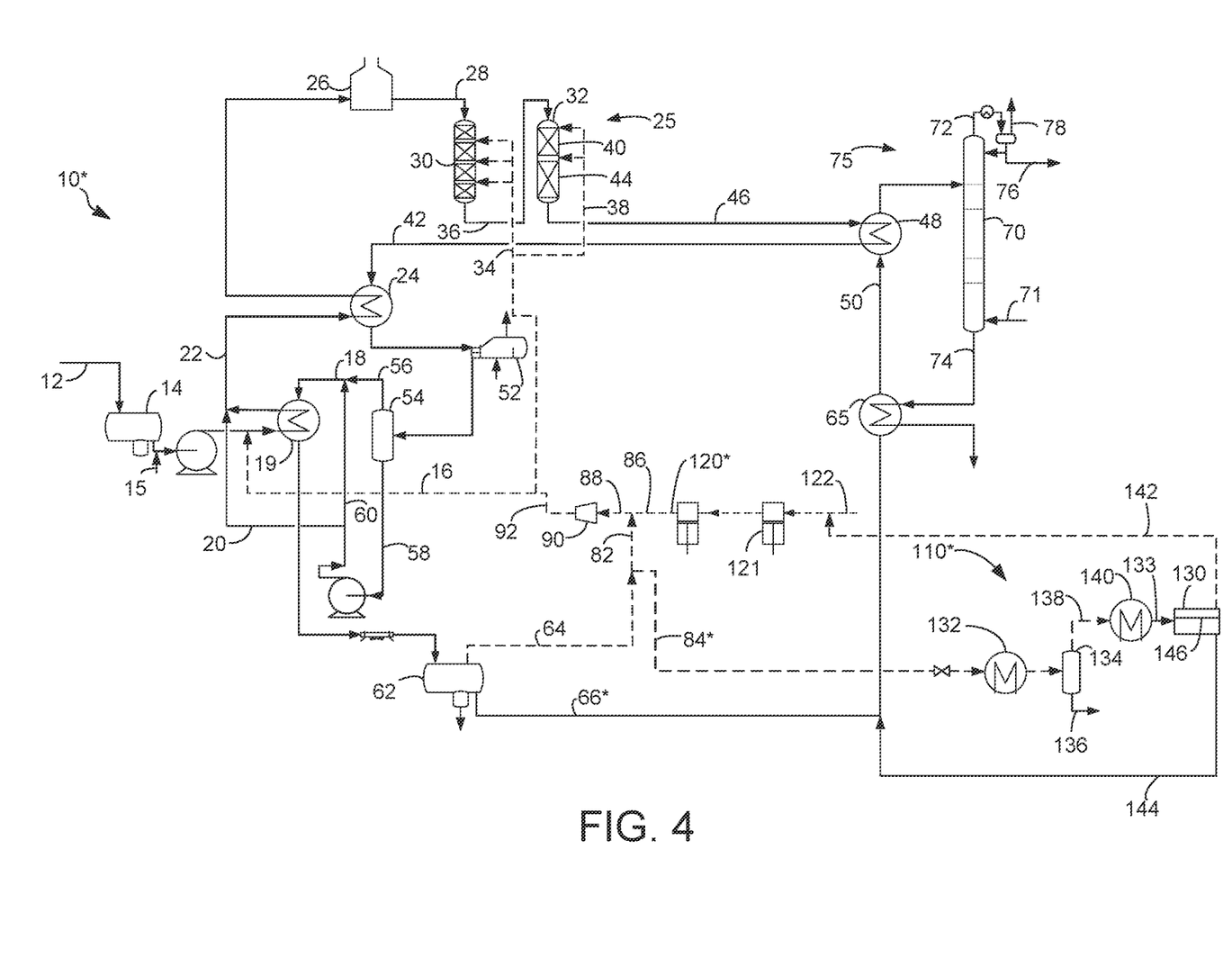
FIG. 4 is a simplified process flow diagram of an alternative embodiment of FIG. 1 or 2.

In another alternative embodiment to FIGS. 1 and 2, the solid media purification unit 110 of FIG. 1 or 110' of FIG. 2 that utilizes a solid media to remove impurities from the absorbed purified gas stream in line 106 of FIG. 1 or the purge gas stream in line 84' of FIG. 2, respectively, may be a membrane unit 130 as shown in FIG. 4. The embodiment using a membrane unit 130 as the purification unit 110" will be described with respect to FIG. 2, but it can be used as the second purification unit 110 of FIG. 1. Elements in FIG. 4 with the same configuration as in FIG. 1 or 2 will have the same reference numeral as in FIG. 1 or 2, respectively. Elements in FIG. 4 which have a different configuration as the corresponding element in FIG. 1 or 2 will have the same reference numeral but designated with an asterisk (*). The configuration and operation of the embodiment of FIG. 4 is essentially the same as in FIG. 2 with the exceptions noted as follows.

In the process of 10* in FIG. 4, the purge gas stream in line 84* is forwarded to a solid media gas purification unit 110* comprising a membrane unit 130. The purge gas stream may be let down in pressure to about 4.8 MPa (700 psig) to about 11.4 MPa (1650 psig), suitably about 4.9 MPa (710 psig) to about 5.2 MPa (760 psig). The depressurized process vapor stream may be cooled in a cooler 132 to a temperature between about 32° C. (90° F.) and about 60° C. (140° F.) to provide a depressurized, cooled, purge gas stream which may contain some liquid, which is removed in a membrane separator 134 in a liquid line 136. The dried, depressurized, cooled, purge gas stream in a membrane separator overhead line 138 may then be heated in a heater 140 to a temperature of about 43° C. (110° F.) to about 82° C. (180° F.) to provide a heated, dried, cooled, membrane feed stream that is fed to the membrane unit 130 in a membrane feed line 133.

The membrane unit 130 utilizes a permeable, solid media comprising a membrane 146 to effect a separation. In the membrane unit 130, the membrane feed stream in line 133 contacts one side of the membrane 146 which allows hydrogen to preferentially diffuse through the membrane relative to the impurities. A permeate contacted purified stream 142 is removed from an opposite side of the membrane 146 comprising a greater concentration of hydrogen than in the purge gas stream and a smaller concentration of impurities than in the purge gas stream. A retentate stream stays on the one side of the membrane 146 and has a greater concentration of impurities, carbon monoxide, carbon dioxide, hydrogen sulfide and light hydrocarbons, than in the purge gas stream and a smaller concentration of hydrogen than in the purge gas stream. From the membrane unit 130, the hydrogen concentration in the permeate contacted purified stream in the permeate line 142 may be at least about 90 mol % and suitably at least 94 mol %, preferably at least about 95 mol % and most preferably at least 96 mol % with the carbon monoxide and carbon dioxide concentration each being below 1 mol %.

The pressure and temperature of the retentate stream in a first retentate line 144 may be essentially the same as in the membrane feed stream in line 133. The pressure of the permeate contacted purified stream in the permeate line 142 may be between about 35 kPa (5 psig) to about 3.1 MPa (450 psig) which may be less than half of the pressure in the membrane feed stream in line 133. The temperature of the permeate feed stream will be about the same as in the membrane feed stream in line 133. The membrane 146 can be installed into the membrane unit 130 with or without support backing as a plurality of tubes. The membrane feed stream in line 133 may be fed inside the tubes with the permeate diffusing peripherally out of the tubes.

The impurity rich stream in the retentate line 144 may be fed to the stripping column 70 of the recovery section 75 along with the cold hydrotreated liquid stream in line 66*. Alternatively, the impurity rich stream may be forwarded to the fuel gas header, perhaps after undergoing absorption to remove acid gases such as in an absorber column similar to the absorber column 100 of FIG. 1. The permeate contacted purified stream in the permeate line 142 has sufficient hydrogen purity to supplement the make-up gas in line 120* and may be at a pressure that can mix with the make-up gas in line 122. Consequently, the contacted purified stream is delivered to the suction side of the make-up gas compressor 121.

The membrane 146 may comprise a high selectivity membrane available from UOP LLC. In an aspect, the membrane may comprise a hollow fiber membrane or spiral wound membrane. The membrane may comprise polyimide, cellulose acetate, cellulose triacetate, polysulfone, polyethersulfone, polyamide, polyphenyl oxide, polyether ether ketone, or combinations thereof that are particularly suited for separation of hydrogen from larger impurities.

The foregoing enables hydrotreating of biorenewable feedstocks while preserving sulfur in the recycle gas to omit or eliminate injection of sulfur into the feed to the hydrotreating reactor section 25 to maintain hydrotreating catalyst activity.

Specific Embodiments

While the following is described in conjunction with specific embodiments, it will be understood that this description is intended to illustrate and not limit the scope of the preceding description and the appended claims.

A first embodiment of the disclosure is a process for hydrotreating a biorenewable feedstock, the process comprising hydrotreating a feed stream comprising a biorenewable feedstock in the presence of hydrotreating hydrogen stream and hydrogen sulfide and a hydrotreating catalyst to hydrodeoxygenate the feed stream to provide a hydrotreated stream; separating the hydrotreated stream into a hydrotreated liquid stream and a hydrotreated gas stream comprising hydrogen, carbon dioxide and hydrogen sulfide; splitting the hydrotreated gas stream into a recycle gas stream and a purge gas stream; and recycling all of the recycle gas stream to the hydrotreating step. An embodiment of the disclosure is one, any or all of prior embodiments in this paragraph up through the first embodiment in this paragraph further comprising adding a make-up hydrogen gas stream to the recycle gas stream, the make-up hydrogen gas stream having a greater concentration of hydrogen than the recycle gas stream. An embodiment of the disclosure is one, any or all of prior embodiments in this paragraph up through the first embodiment in this paragraph further comprising purifying the purge gas stream in a purification unit to increase a hydrogen concentration of the purge gas stream. An embodiment of the disclosure is one, any or all of prior embodiments in this paragraph up through the first embodiment in this paragraph wherein the purification step comprises contacting the purge gas stream in the purification unit with a solid media to remove impurities from the purge gas stream to provide a contacted purified gas stream. An embodiment of the disclosure is one, any or all of prior embodiments in this paragraph up through the first embodiment in this paragraph further comprising feeding an impurity rich stream from the purification unit with the hydrotreated liquid stream to a product recovery section. An embodiment of the disclosure is one, any or all of prior embodiments in this paragraph up through the first embodiment in this paragraph further comprising feeding the purified gas stream to a hydrotreating reactor. An embodiment of the disclosure is one, any or all of prior embodiments in this paragraph up through the first embodiment in this paragraph further comprising mixing the purified gas stream with the recycle gas stream. An embodiment of the disclosure is one, any or all of prior embodiments in this paragraph up through the first embodiment in this paragraph wherein the purifying step comprises contact of the purge gas stream with an absorbent stream to absorb impurities from the purge gas stream to provide an absorbed purified gas stream.

A second embodiment of the disclosure is a process for hydrotreating a biorenewable feedstock, the process comprising hydrotreating a feed stream comprising a biorenewable feedstock in the presence of hydrotreating hydrogen stream comprising at least 50 wppm hydrogen sulfide and a hydrotreating catalyst to deoxygenate the contacted feed stream to provide a hydrotreated stream; separating the hydrotreated stream into a hydrotreated liquid stream and a hydrotreated gas stream comprising hydrogen, carbon dioxide and hydrogen sulfide; and recycling the hydrotreating hydrogen stream comprising at least a portion of the hydrotreated gas stream to the hydrotreating step. An embodiment of the disclosure is one, any or all of prior embodiments in this paragraph up through the second embodiment in this paragraph further comprising splitting the hydrotreated gas stream into a recycle gas stream and a purge gas stream and the hydrotreating hydrogen stream comprising the recycle gas stream. An embodiment of the disclosure is one, any or all of prior embodiments in this paragraph up through the second embodiment in this paragraph further comprising purifying the purge gas stream in a purification unit to provide a purified gas stream and an impurity rich stream. An embodiment of the disclosure is one, any or all of prior embodiments in this paragraph up through the second embodiment in this paragraph further comprising feeding the impurity rich stream from the purification unit with the hydrotreated liquid stream to a product recovery section. An embodiment of the disclosure is one, any or all of prior embodiments in this paragraph up through the second embodiment in this paragraph further comprising mixing the purified gas stream with the recycle gas stream to provide the hydrotreating hydrogen stream. An embodiment of the disclosure is one, any or all of prior embodiments in this paragraph up through the second embodiment in this paragraph further comprising mixing a make-up gas stream with the purified gas stream and the recycle gas stream. An embodiment of the disclosure is one, any or all of prior embodiments in this paragraph up through the second embodiment in this paragraph wherein the purifying step comprises contact of the purge gas stream with an absorbent stream to absorb impurities gases from the purge gas stream to provide an absorbed gas stream and/or contacting the purge gas stream or the absorbed gas stream with a solid media to remove impurities from the purge gas stream or the absorbed gas stream to provide a contacted gas stream.

A third embodiment of the disclosure is a process for hydrotreating a biorenewable feedstock, the process comprising hydrotreating a feed stream comprising a biorenewable feedstock in the presence of hydrotreating hydrogen stream and a hydrotreating catalyst to deoxygenate the contacted feed stream to provide a hydrotreated stream; separating the hydrotreated stream into a hydrotreated liquid stream and a hydrotreated gas stream comprising hydrogen, carbon dioxide and hydrogen sulfide; contacting at least a portion of the hydrotreated gas stream with a solid media to remove impurities from the portion of the hydrotreated gas stream to provide a contacted gas stream; and recycling the contacted gas stream to the hydrotreating step. An embodiment of the disclosure is one, any or all of prior embodiments in this paragraph up through the third embodiment in this paragraph further comprising splitting the hydrotreated gas stream into a recycle gas stream and a purge gas stream and mixing the recycle gas stream with the contacted gas stream, wherein the portion of the hydrotreated gas stream is the purge gas stream. An embodiment of the disclosure is one, any or all of prior embodiments in this paragraph up through the third embodiment in this paragraph further comprising contacting the purge gas stream with an absorbent stream to remove impurities before contacting the purge gas stream with a solid media to remove impurities. An embodiment of the disclosure is one, any or all of prior embodiments in this paragraph up through the third embodiment in this paragraph further comprising mixing the contacted gas stream and the recycle gas stream with a make-up gas stream.

Without further elaboration, it is believed that using the preceding description that one skilled in the art can utilize the present disclosure to its fullest extent and easily ascertain the essential characteristics of this disclosure, without departing from the spirit and scope thereof, to make various changes and modifications of the disclosure and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for hydrotreating a biorenewable feedstock, the process comprising:

injecting sulfur to a feed stream comprising a biorenewable feedstock and passing the feed stream comprising the biorenewable feedstock with injected sulfur to a hydrotreating reactor section;

hydrotreating said feed stream comprising said biorenewable feedstock in the hydrotreating reactor section in presence of a hydrotreating hydrogen stream comprising at least 50 wppm hydrogen sulfide and a hydrotreating catalyst to hydrodeoxygenate the feed stream to provide a hydrotreated stream;

separating said hydrotreated stream into a hydrotreated liquid stream and a hydrotreated gas stream comprising hydrogen, carbon dioxide and hydrogen sulfide;

splitting said hydrotreated gas stream into a recycle gas stream and a purge gas stream;

purifying the purge gas stream in a purification unit with a solid media to remove impurities from said purge gas stream to provide a contacted purified gas stream; and mixing said contacted purified gas stream with said recycle gas stream to provide said hydrotreating hydrogen stream.

2. The process of claim 1 further comprising adding a make-up hydrogen gas stream to said recycle gas stream, said make-up hydrogen gas stream having a greater concentration of hydrogen than said recycle gas stream.

3. The process of claim 1 further comprising purifying the purge gas stream in an absorber column to increase a hydrogen concentration of said purge gas stream prior to said purifying said purge gas stream in said purification unit with a solid media.

4. The process of claim 1 further comprising feeding an impurity rich stream from said purification unit along with said hydrotreated liquid stream to a product recovery section.

5. The process of claim 3 wherein said purifying step in said absorber column comprises contact of said purge gas stream with an absorbent stream to absorb impurities from said purge gas stream.

6. A process for hydrotreating a biorenewable feedstock, the process comprising:

injecting sulfur to a feed stream comprising a biorenewable feedstock and passing the feed stream comprising the biorenewable feedstock with injected sulfur to a hydrotreating reactor section;

hydrotreating said feed stream comprising said biorenewable feedstock in said hydrotreating reactor section in presence of a hydrotreating hydrogen stream comprising at least 50 wppm hydrogen sulfide and a hydrotreating catalyst to hydrodeoxygenate said feed stream to provide a hydrotreated stream;

separating said hydrotreated stream into a hydrotreated liquid stream and a hydrotreated gas stream comprising hydrogen, carbon dioxide and hydrogen sulfide;

purifying a first portion of said hydrotreated gas stream to provide a contacted purified gas stream; and mixing said contacted purified gas stream with a second portion of said hydrotreating gas stream to provide said hydrotreating hydrogen stream.

7. The process of claim 6 further comprising splitting said hydrotreated gas stream into a recycle gas stream and a purge gas stream, wherein said purge gas stream comprises said first portion of said hydrotreating gas stream and said recycle gas stream comprises said second portion of said hydrotreating gas stream.

8. The process of claim 7 wherein purifying said purge gas stream in said purification unit provides said contacted purified gas stream and an impurity rich stream.

9. The process of claim 8 further comprising feeding said impurity rich stream from said purification unit with said hydrotreated liquid stream to a product recovery section.

10. The process of claim 8 further comprising mixing a make-up gas stream with said contacted purified gas stream and said recycle gas stream.

11. The process of claim 8 wherein said purifying step comprises contact of said purge gas stream with an absorbent stream to absorb impurities gases from said purge gas stream to provide an absorbed gas stream and/or contacting said purge gas stream or said absorbed gas stream with a solid media to remove impurities from said purge gas stream or said absorbed gas stream to provide said contacted purified gas stream.

12. A process for hydrotreating a biorenewable feedstock, the process comprising:

injecting sulfur to a feed stream comprising a biorenewable feedstock and passing the feed stream comprising the biorenewable feedstock with injected sulfur to a hydrotreating reactor section;

hydrotreating said feed stream comprising said biorenewable feedstock in said hydrotreating reactor section in presence of a hydrotreating hydrogen stream and a hydrotreating catalyst to hydrodeoxygenate said feed stream to provide a hydrotreated stream;

separating said hydrotreated stream into a hydrotreated liquid stream and a hydrotreated gas stream comprising hydrogen, carbon dioxide and hydrogen sulfide;

splitting said hydrotreated gas stream into a recycle gas stream and a purge gas stream;

contacting said purge gas with a solid media to remove impurities and provide a contacted gas stream, wherein the solid media is a permeable membrane; and recycling said contacted gas stream and said recycle gas stream to said hydrotreating step as components of said hydrotreating hydrogen stream, wherein said hydrotreating hydrogen stream further comprises at least 50 wppm hydrogen sulfide.

13. The process of claim 12 further comprising mixing said recycle gas stream with said contacted gas stream.

14. The process of claim 12 further comprising contacting said purge gas stream with an absorbent stream to remove impurities before contacting said purge gas stream with a solid media to remove impurities.

15. The process of claim 14 further comprising mixing said contacted gas stream and said recycle gas stream with a make-up gas stream.

* * * * *